Oct. 21, 1969    L. W. BURTON    3,474,436
FUSE MONITORING CIRCUIT
Filed May 4, 1966    2 Sheets-Sheet 1
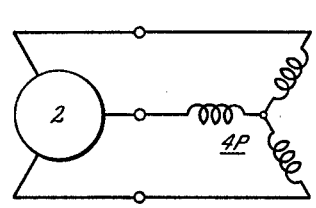
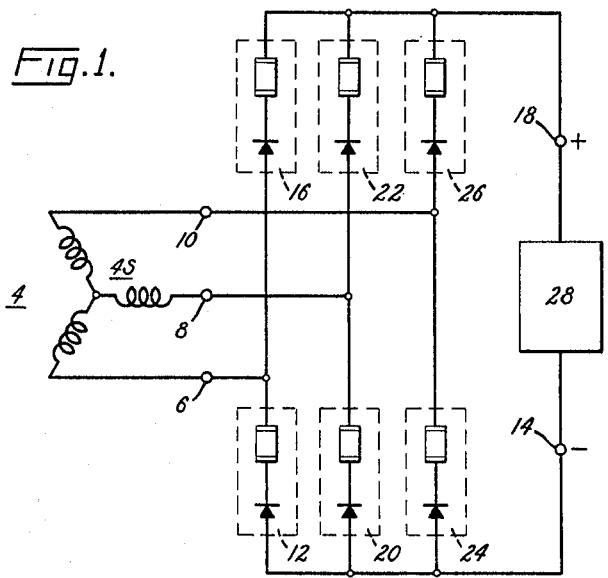
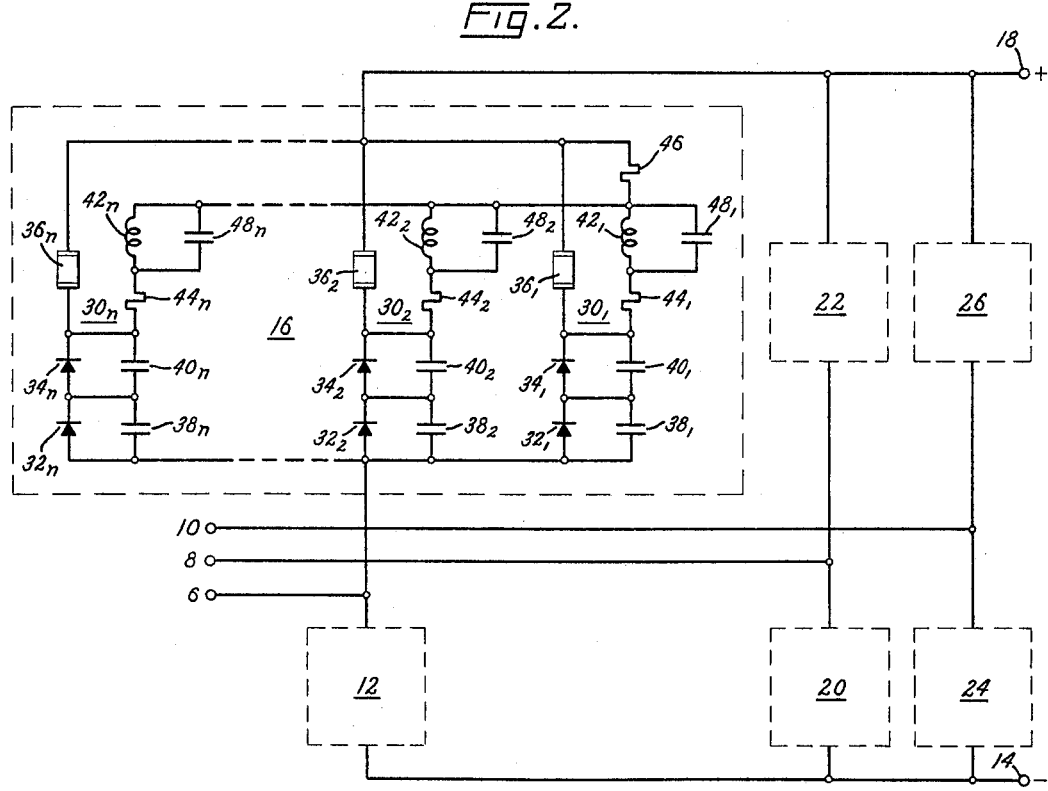
INVENTOR:
LESTER W. BURTON,
BY Albert S. Richardson Jr.
ATTORNEY Oct. 21, 1969  L. W. BURTON  3,474,436
FUSE MONITORING CIRCUIT Filed May 4, 1966  2 Sheets-Sheet 2

INVENTOR:
LESTER W. BURTON,
BY Albert S. Richardson Jr.
ATTORNEY

United States Patent Office 3,474,436
Patented Oct. 21, 1969

3,474,436
FUSE MONITORING CIRCUIT
Lester W. Burton, Villanova, Pa., assignor to General Electric Company, a corporation of New York
Filed May 4, 1966, Ser. No. 547,551
Int. Cl. G08b 21/00
U.S. Cl. 340—250   10 Claims

ABSTRACT OF THE DISCLOSURE

The failure of one or more parallel diodes in power rectifier equipment is monitored by connecting across each diode-isolated fuse a reed relay whose contacts, when actuated, will complete a signal circuit including individual trigger fuses and a common current-pulse responsive stepping switch.

---

This invention relates to monitoring circuits. More specifically, it relates to apparatus for detecting and indicating misoperation of any of a plurality of parallel-connected circuit legs used in electric power conversion installations.

This invention is particularly useful in large rectifier systems which supply high currents through rectifier banks each comprising a plurality of parallel-connected rectifier legs. Such rectifier banks may be used individually, as in single-phase A-C to D-C conversion, or they may be used in multiple, as in a polyphase system with a rectifier bank connected to each phase of the A-C power source. Sometimes an individual rectifier leg will fail to block as it becomes reverse biased, thus conducting current in a reverse or blocking direction. This results in reverse current of relatively high magnitude in that leg, which current is interrupted by an electric fuse provided in the rectifier leg for this purpose. When a fuse has blown in one or more rectifier legs, increased forward current duty will be imposed on the remaining sound rectifier legs, thereby increasing the risk of their early failure. Suitable warning or protective circuitry are therefore provided to prevent the failure of an entire rectifier bank upon the failure of one or more of its legs. Such circuitry generally includes means for monitoring the respective rectifier legs and means for disconnecting the rectifier bank from the power source if the monitor indicates failure of a predetermined number of legs within the bank.

Heretofore monitoring circuits have commonly included a small "trigger" fuse connected across the main fuse in each rectifier leg. When a trigger fuse blows in response to blowing of the associated main fuse, it actuates contacts connected in a signaling portion of the montoring circuit. The trigger fuses used in such a scheme comprise economical and compact means of providing the desired detecting and indicating functions. However, the prior art trigger fuse circuits have not been entirely satisfactory from the viewpoint of electrically isolating the low-voltage signaling circuit from the power circuit in which the rectifier legs are connected, particularly in relatively high voltage applications where the rectifier output voltage is 500 volts or higher.

Other prior art monitoring circuits have attempted to use special electromagnetic relays as coupling means between the individual rectifier legs and the signaling circuit. However, these are often too expensive or bulky to be used with a plurality of rectifier legs operating in the prescribed voltage range.

Accordingly, it is an object of this invention to provide an improved blown fuse detection and indication circuit.

It is an object of this invention to provide a relatively simple and inexpensive fuse monitoring circuit in which each of a plurality of relatively high voltage power circuit legs is effectively insulated from an associated signaling circuit.

Another object of this invention is the provision, for relatively high voltage applications having a large number of parallel circuits to be monitored, of improved monitoring apparatus which is inexpensive to manufacture and maintain.

Briefly stated, and in accordance with one aspect of this invention, a fuse monitoring circuit is provided for an electric power system having a plurality of component-containing legs connected in parallel between a voltage source and a load. A component-isolating fuse is serially connected in each of the legs, and it will "blow" in response to the failure of a component in the associated leg. By "blowing" I mean that the normal current-conducting fuse link opens due to an abnormal increase in current magnitude, whereby the fuse interrupts all current in the faulted leg and isolates the failed component from the power system. According to my invention, the monitoring circuit comprises switching means, including a pair of separable contacts, connected to each leg of the power system so that its contacts are actuated as a result of the aforesaid component failure. The switching means is so constructed that its contacts are electrically isolated from the associated leg so long as the power system is operated within the voltage range of the source. These contacts are connected in a signaling circuit to couple a low-voltage signal source and a current pulse responsive means to a corresponding circuit interrupting means when actuated. The resulting current flow in the signaling circuit energizes the current pulse responsive means and causes the corresponding circuit interrupting means to open. The signaling circuit also includes means responsive to opening of the circuit interrupting means for indicating which component-isolating fuse has blown.

While the subject matter of the present invention is particularly pointed out in the concluding portion of this specification, the following description of the invention, taken in conjunction with the accompanying drawings, should be referred to for a better understanding of the manner and process of making and using this invention.

FIG. 1 is a schematic diagram of an alternating-current to direct-current conversion system in which this invention is useful;

FIG. 2 is a schematic diagram of one of the rectifier banks depicted symbolically in FIG. 1;

Figure 3:
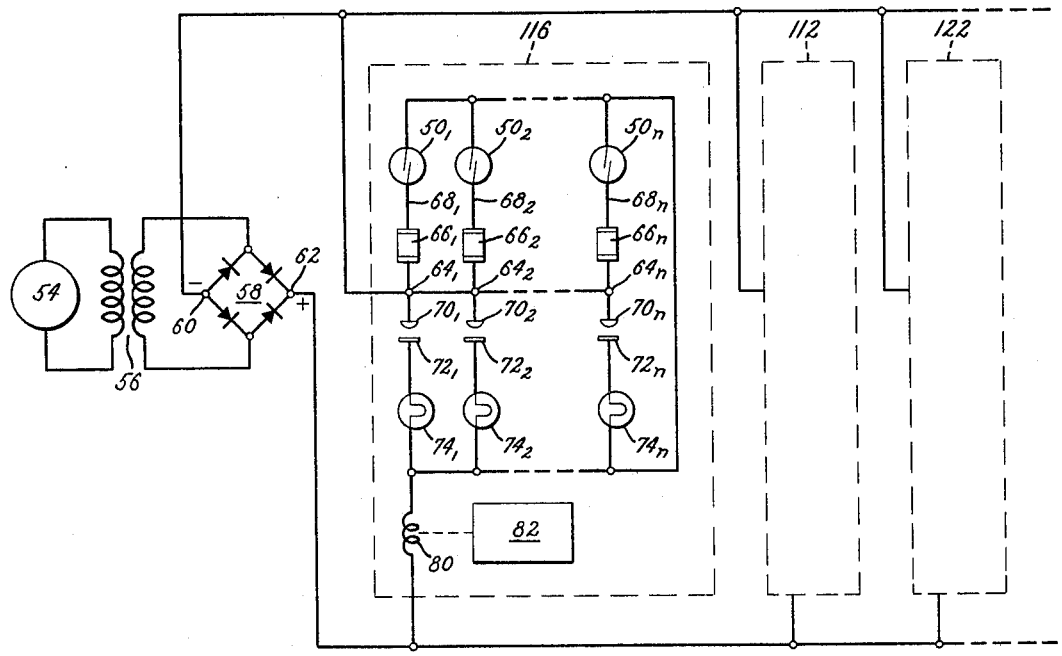
FIG. 3 is a schematic diagram of a signaling circuit constructed in accordance with the principles of this invention.

This invention is useful to indicate the failure of any of a plurality of circuit elements and to monitor the failure of a plurality of these elements. For example, FIG. 1 shows an A-C to D-C conversion system in which this invention is useful to indicate the failure of a power diode to block reverse voltage. Power is coupled from a source 2 through a primary winding 4P and a secondary winding 4S of a transformer 4 and through transformer terminals 6, 8, and 10 to the rectifying portion of the circuit. In a three-phase, full-wave rectifier system, a rectifier bank 12 couples negative polarity voltage of a first phase from the A-C terminal 6 to a negative D-C output terminal 14 and a rectifier bank 16 couples positive polarity voltage from the same A-C terminal 6 to a positive D-C output terminal 18. Similarly, the rectifier banks 20 and 22 couple voltage of a second phase from its A-C terminal 8 to the D-C terminals 14 and 18, respectively; and the rectifier banks 24 and 26 couple voltage of the third phase from its terminal 10 to the D-C terminals 14 and 18, respectively. The D-C output terminals 14 and 18 are connected to a load 28.

FIG. 2 shows a schematic diagram of the rectifier bank 16 as it is constructed in the illustrated embodiment of this invention and shows its relation to the other rectifier banks which may be similarly constructed. The rectifier bank 16 may comprise a plurality of rectifier legs $30_1$, $30_2 \ldots 30_n$, depending upon the power coupled through the bank 16 and the current carrying capacity of each leg.

Each rectifier leg includes one or more unidirectional components, such as silicon diodes, which are hereinafter referred to as rectifiers. The rectifiers in each leg are connected between A-C terminal 6 and D-C terminal 18 in series with a fuse element to conduct a portion of the load current supplied by the bank 16. Thus the rectifier leg $30_1$ comprises a pair of rectifiers $32_1$ and $34_1$ and a main fuse $36_1$ connected in series between the terminals 6 and 18. The number of rectifiers used in a rectifier leg depends upon the voltage level of the transformer secondary 4S and the voltage blocking characteristics of the individual rectifiers used. While for many applications a single rectifier is sufficient, it is not uncommon to use two or more connected in series when power is coupled from a relatively high voltage source to a load. Voltage dividing capacitors $38_1$ and $40_1$ are coupled across the rectifiers $32_1$ and $34_1$, respectively.

If the rectifiers in a rectifier leg should fail to block reverse voltage, reverse current of very high magnitude will begin to flow, thereby causing the fuse in that rectifier leg, such as the fuse $36_1$ in the leg $30_1$, to blow. In order to detect this misoperation and to indicate which rectifier leg has failed, a reed relay coil $42_1$ is coupled across the main fuse $36_1$ by connections which preferably include a resistor $44_1$ connected to the junction of the fuse $36_1$ and the rectifier $34_1$ and a resistor 46 which is common to each of the rectifier legs in the rectifier bank 16. A small capacitor $48_1$ is connected across the reed relay coil $42_1$ to prevent the relay contacts from vibrating.

Each of the remaining rectifier legs $30_2 \ldots 30_n$ has similar components which are numbered with appropriate subscripts in FIG. 2.

Figure 5:
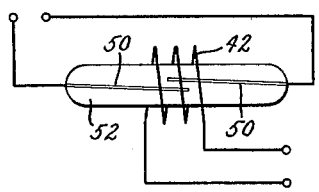
FIG. 5 shows a reed relay of the type which can be used in accordance with this invention.

As stated above, a principal problem in designing a monitoring circuit of the present type is that of providing a device for activating a signaling circuit upon failure of a component which device is both inexpensive and relatively small yet is safe in the sense of electrically isolating the signaling circuit from each of the legs of the rectifier power circuit. The desired result is accomplished in accordance with the principles of this invention by using a reed relay or switch of the type shown in FIG. 5 in which a pair of magnetically-sensitive reed-like arms or contacts 50 are encapsulated within an evacuated glass tube 52. The reed relay coil 42 surrounds the encapsulated, normally open contact arms 50 and causes the contact arms to move together to close the switch when the reed relay coil is energized. The entire reed relay is encapsulated with the relay coil terminals at one end thereof and the contact arm terminals at the other. The reed relay may also include a magnet for biasing the contact arms in a normally open position.

The signaling circuit shown in FIG. 3 comprises an A-C voltage source 54 having its output coupled through a transformer 56 to a full-wave rectifier bridge 58. The transformer 56 is normally a step down transformer of the type which allows the rectifier bridge 58 to develop a relatively low voltage at its D-C terminals 60 and 62, often in the range of 24 volts D-C.

Each rectifier bank has a corresponding section in the signaling circuit. There is a section 116 for rectifier bank 16, a duplicate section 112 for bank 12, another section 122 for bank 22, and so forth. Each section includes a current responsive means, such as that numbered 80 in the section 116 to couple signals generated upon failure of any rectifier leg in the bank 16 to a monitoring circuit 82 of appropriate design. Each section of the signaling circuit also includes a plurality of similar components corresponding in number to the parallel legs in the associated rectifier bank. More particularly, for the first leg $30_1$ of bank 16 there is in section 116 a circuit interrupting means that preferably comprises a "trigger" fuse $66_1$. A common terminal $64_1$ of the fuse $66_1$ is connected directly to the terminal 60 of the signal power source, while a line terminal $68_1$ of this fuse is coupled to one side of the current responsive device 80 of section 116 by means of the contacts $50_1$ of the reed relay associated with leg $30_1$. The other side of device 80 is connected to the opposite terminal 62 of the signal power source. Upon activation of the reed relay contacts $50_1$, sufficient current will flow from the signal source through the fuse $66_1$ and the current responsive means 80 to quickly open the fuse 66. Section 116 is further provided with means responsive to the opening of the trigger fuse $66_1$ for indicating that a malfunction occurred in the rectifier leg $30_1$ to cause the fuse $36_1$ to blow. In the preferred embodiment of the invention this means includes a trigger fuse plunger $70_1$ and plunger terminal $72_1$ connected through a signal lamp $74_1$ to the current responsive means 80. The described portion of the signaling circuit also includes similar components, marked with appropriate subscripts, corresponding to the remaining rectifier legs of the rectifier bank 16.

Figure 4:
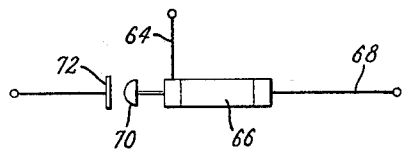
FIG. 4 is a diagram of a "trigger" fuse.

FIG. 4 is a diagram showing the structure of a trigger fuse 66 of the type that can be used in the signaling circuit shown in FIG. 3. Before the trigger fuse 66 has blown, the common terminal 64 is coupled through the fuse link to the line terminal 68. The spring loaded plunger 70 and the plunger terminal 72 form a normally opened switch. When the fuse blows the plunger 70 contacts the plunger terminal 72 to close the circuit between the common terminal 64 and the plunger terminal 72.

During the operation of the circuit shown in FIG. 1, voltage which is positive in polarity is coupled from each of the voltage phases and through the rectifier banks 16, 22, and 26, to the terminal 18, while voltage which is negative in polarity is coupled through the rectifier banks 12, 20, and 24 to the terminal 14. Referring to the rectifier bank 16, as shown in FIG. 2, conventional current can be conducted only in the forward direction through each of the paralleled rectifier legs $30_1$, $30_2 \ldots 30_n$ from terminal 6 to terminal 18. Assuming however that both of the rectifiers $32_1$ and $34_1$ fail, the rectifier leg $30_1$ will no longer be able to hold off or block reverse current during the half cycle when vlotage at A-C terminal 6 is negative with respect to 18. Now reverse current increases in this leg until the main fuse $36_1$ blows to isolate the failed components. The resistors $44_1$ and 46 couple the reed relay coil $42_1$ to this fuse so that the reed relay is activated by the voltage now appearing across the open fuse. Referring to FIG. 3, the reed relay contacts $50_1$ are closed by the energized coil $42_1$ (FIG. 2). A surge or pulse of current begins to flow from the terminal 62 and through the current responsive coil 80, the reed relay contacts $50_1$, and the trigger fuse $66_1$, to the terminal 60. Thus there is a temporary low resistance path across the power supply which opens the trigger fuse $66_1$ which causes the plunger $70_1$ to contact the plunger terminal $72_1$, thereby connecting the signal lamp $74_1$ across the power supply to indicate which of the rectifier legs has failed. At the same time the initial surge of current caused by the closing of the contacts $50_1$ operatively energizes the current responsive device 80. The steady current which subsequently flows through the lamp $74_1$ will be too low to effect a second operation of device 80.

The current responsive device 80 may comprise a coil of a notching relay or stepping switch forming a part of a monitoring circuit shown generally as 82. This monitoring circuit 82 may, in response to a predetermined number of failures in a rectified bank, either shut down the whole rectifier system in which the blown fuse detecting and indicating circuit is installed, or it may provide some visible or audible indication that the system should be repaired. For this purpose the notching relay need only be energized momentarily by a current pulse each time a parallel rectifier leg fails.

The current responsive means 80 need not be a notching relay coil itself but may comprise an intermediary device such as the control winding of a magnetic amplifier. In this case the monitoring circuit also includes a magnetic amplifier whose gate winding is connected in circuit with suitable apparatus which can perform protective measures upon failure of one or more rectifier legs.

The selection and arrangement of the reed relay 42, 50 may be critical where load buses carry high currents in a relatively high power system. Thus the reed relay, which is sensitive to magnetic fields, should be located away from load current buses carrying high current densities. If the reed relay location were close to such a bus, then the axis of its tube 52 should preferably be oriented parallel to that bus.

This invention is not limited to the particular details of the preferred embodiment illustrated, and it is contemplated that various modifications and applications within the scope of this invention will occur to those skilled in the art. For example, the indicating and monitoring circuit may be used in applications to monitor the failure of components other than rectifiers. Furthermore, this circuit may be used with other than three-phase, full-wave power conversion systems. In view of the possibility that the form in which the invention is practiced can vary from the form which has been specifically disclosed herein, it should be understood that I do not wish to be limited to the exact details of construction of the illustrated embodiment.

What I claim as new and desire to secure by Letters Patent of the United States is:

1. A fuse monitoring circuit for a rectifier bank including a plurality of rectifier legs connected in parallel between a voltage source and a load, comprising, in combination:
   (a) the plurality of rectifier legs;
   (b) a plurality of fuse means serially connected in said rectifier legs, respectively;
   (c) a plurality of reed relay means respectively associated with said rectifier legs, each of said relay means including a relay coil and relay contacts and each of said relay means being so constructed that its contacts are electrically isolated from its coil;
   (d) means for respectively connecting the coils of said reed relay means to said fuse means so that a given coil is energized and the associated contacts are actuated in response to the blowing of the fuse means to which that coil is connected;
   (e) a signal circuit comprising a signal power source, current pulse responsive means for monitoring the blowing of any of said fuse means, and a plurality of normally closed circuit interrupting means, each of said circuit interrupting means being arranged to open when subjected to a current pulse; and
   (f) means for connecting the contacts of said plurality of reed relay means in said signal circuit to couple said signal power source and said current pulse responsive means to the respective circuit interrupting means upon actuation of the contacts of the corresponding relay means, whereby said current pulse responsive means is operatively energized and a circuit interrupting means is opened by the signal current pulse that flows therethrough when said contacts are actuated.

2. A fuse monitoring circuit according to claim 1 wherein said circuit interrupting means comprises an electric current fuse that is opened by said signal current pulse.

3. A fuse monitoring circuit according to claim 1 wherein there is provided additional means operative when each of said circuit interrupting means opens for indicating that a corresponding fuse means has been blown.

4. A fuse monitoring circuit according to claim 3 wherein each circuit interrupting means comprises a trigger fuse having a trigger fuse plunger and plunger contact and said additional means comprises a plurality of signal lamps respectively connected to the plunger contacts of the trigger fuses for individual energization by said signal power source when a corresponding trigger fuse opens.

5. A fuse monitoring circuit according to claim 4 wherein the trigger fuse and the reed relay contacts corresponding to each of said rectifier legs are connected in one series circuit and the trigger fuse plunger and contact and the signal lamp corresponding to each of said rectifier legs are connected in a separate series circuit, both of said series circuits being connected in parallel between said signal power source and said current pulse responsive means.

6. A fuse monitoring circuit according to claim 1 wherein said current pulse responsive means comprises a notching relay and means for counting the number of times the notching relay operates.

7. A monitoring circuit for a rectifier bank including a plurality of rectifier legs connected in parallel between a voltage source and a load, comprising, in combination:
   (a) the plurality of rectifier legs;
   (b) a plurality of reed relays respectively coupled to said legs, each reed relay including a pair of separable contacts that are actuated in response to an abnormal flow of reverse current in the associated leg;
   (c) a signal circuit comprising a signal power source, a current responsive means, the contact pairs of said plurality of reed relays, and a similar plurality of trigger fuses; and
   (d) means for serially interconnecting said signal power source, said current responsive means, and the parallel combination of said trigger fuses in series, respectively, with said pairs of contacts.

8. A monitoring circuit according to claim 7 wherein said circuit also includes a plurality of signal lamps respectively connected to said trigger fuses, each of said trigger fuses being arranged, when open, to complete a signal current conducting circuit including the associated signal lamp and said signal power source.

9. A rectifier circuit having at least one rectifier bank in which a plurality of rectifier legs are connected in parallel between an A-C voltage source and a D-C load, comprising, in combination:
   (a) the plurality of rectifier legs;
   (b) a main fuse connected in series with a rectifier in each of said rectifier legs;
   (c) reed relay means including a relay coil and a pair of relay contacts for each rectifier leg, said relay means being so constructed that said relay contacts are electrically isolated from said relay coil within the voltage range of said source, said relay coil being connected across the corresponding main fuse in each rectifier leg so that the relay coil is energized if the main fuse blows;
   (d) a signal circuit comprising a signal power source, current pulse responsive means for monitoring the blowing of any main fuse, and for each rectifier leg a signal lamp and a trigger fuse having a trigger fuse plunger and plunger contact; and
   (e) means for connecting said relay contacts for each rectifier leg in a series circuit with a corresponding trigger fuse, and means for connecting said trigger fuse plunger and plunger contact and said signal lamp for each rectifier leg in another series circuit, said series circuits being connected in parallel with each other and in series with said signal power source and said current pulse responsive means.

10. A rectifier circuit according to claim 9 wherein said current pulse responsive means comprises a notching relay coil.

References Cited

UNITED STATES PATENTS

| | | | |
|---|---|---|---|
| 2,930,961 | 3/1960 | Lezan | 340—250 XR |
| 3,023,353 | 2/1962 | Currey | 317—52 XR |
| 3,045,167 | 7/1962 | Colaiaco | 340—250 XR |
| 3,260,916 | 7/1966 | Watrous | 321—14 XR |

FOREIGN PATENTS 171,230  5/1906  Germany.

JOHN W. CALDWELL, Primary Examiner

DANIEL K. MYER, Assistant Examiner

U.S. Cl. X.R.

321—14; 340—253